Figure 1:
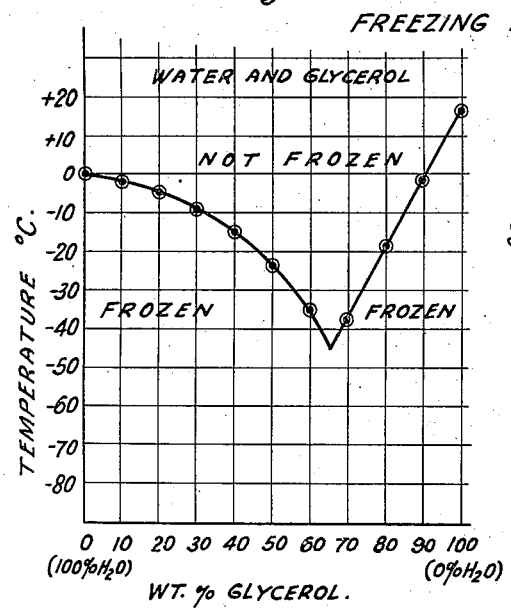

April 28, 1942.   F. H. REICHEL ET AL   2,281,513
PRESERVED PRODUCT
Filed Dec. 29, 1939

INVENTORS
FRANK H. REICHEL
RALPH T. K. CORNWELL
BY John L. Oemes
ATTORNEY

Patented Apr. 28, 1942

2,281,513

UNITED STATES PATENT OFFICE 2,281,513

PRESERVED PRODUCT

Frank H. Reichel and Ralph T. K. Cornwell, Fredericksburg, Va., assignors to Sylvania Industrial Corporation, Fredericksburg, Va., a corporation of Virginia Application December 29, 1939, Serial No. 311,530

9 Claims. (Cl. 99—171)

This invention relates to casings and wrappers for foodstuffs which may be subjected to low temperatures and to frozen food products encased in such casings and wrappers. In particular, the invention relates to the preservation of foods by refrigeration, and to correlated improvements designed to enhance the properties and to increase the utility of such products.

In the frozen-food industry there has arisen a need for an encased food product which will withstand sub-atmospheric temperatures without the wrapper becoming stiff or brittle, or suffering damage due to cracking, thus exposing the foodstuff to dirt and germs. The embrittlement of food wrappers such as regenerated cellulose may be caused by the crystallization within the pellicle of water, softeners, and plasticizers which may be incorporated with such wrappers. Furthermore, such crystallization tends to impair the transparency of the wrapper.

It is desirable to maintain the wrapper on a frozen food product in a substantially flexible condition at all times, especially when the food product is undergoing a freezing treatment. There is a need for a wrapper which will not become hard and stiff at the low temperatures to which frozen food products are subjected. A wrapper which will remain soft and pliable at these low temperatures will be easier to handle without danger of breaking and will present an attractive package at all times.

Softeners which have been suggested heretofore for use in pellicles formed of hydrophilic colloidal materials and used as casings for such comestibles include mixtures of water with glycerol, or water with ethylene glycol, and the like, but all these mixtures crystallize at various temperatures below 0° C., depending upon the percentage of softener in the wrapper. Thus, these softeners have not solved the present problem in the frozen food industry.

It is an object of the invention to provide a food product having a wrapper which will withstand sub-atmospheric temperatures.

It is a further object of the invention to provide a foodstuff having a wrapper comprising a non-fibrous hydrophilic colloidal pellicle which will withsand temperatures below 0° C. without stiffening or becoming fractured, and which will remain transparent at such temperatures.

Another object of the invention is to provide a food product encased in a water-swelling non-fibrous cellulosic material containing a plasticizer which will improve the plasticity of the cellulosic material and which will not crystallize at sub-atmospheric temperatures.

It is another object of the invention to provide a comestible wrapped in a pellicle of non-fibrous hydrophilic colloidal material containing a plasticizer which will prevent the food product from becoming contaminated or exposed due to cracking of the wrapper during freezing.

Other objects of the invention will in part be obvious and will in part appear hereinafter.

The invention accordingly comprises wrapping a food product in a pellicle formed of a non-fibrous organic hydrophilic colloid containing a plasticizer comprising a mixture of water, glycerol and diethylene glycol, being present in such quantity as to maintain the pellicle flexible at both room temperature and sub-atmospheric temperatures, and freezing the food product while encased in the pellicle, and to a method for producing such a wrapper. In the specification and claims the term "softener" will be used to indicate a mixture of glycerol and diethylene glycol, and the term "plasticizer" will be used to designate a mixture of water, glycerol and diethylene glycol.

The invention accordingly comprises novel products possessing the characteristics, properties, elements and the relation of elements and a process having the steps and relation of steps, all as exemplified in the following detailed disclosure and the scope of the application of which will be indicated in the claims. For a more complete understanding of the nature and objects of the invention, reference should be had to the accompanying drawing in which Fig. 1 shows a freezing-point curve for various mixtures of water and glycerol.

Figure 2:
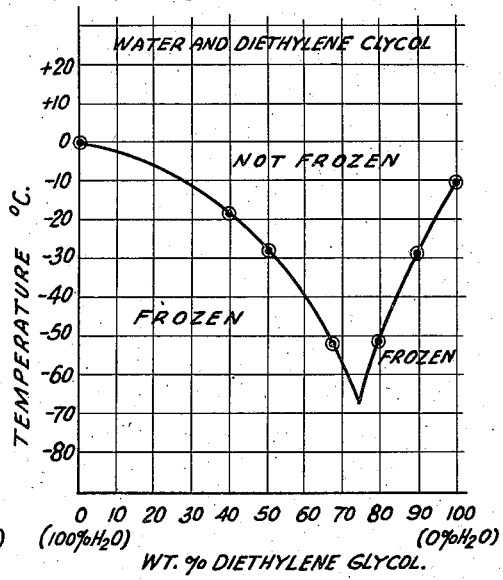

Fig. 2 shows a freezing-point curve for various mixtures of water with diethylene glycol.

Figure 3:
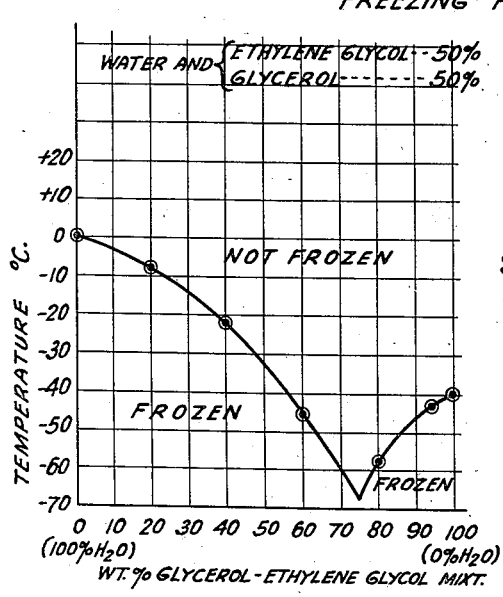
Figure 4:
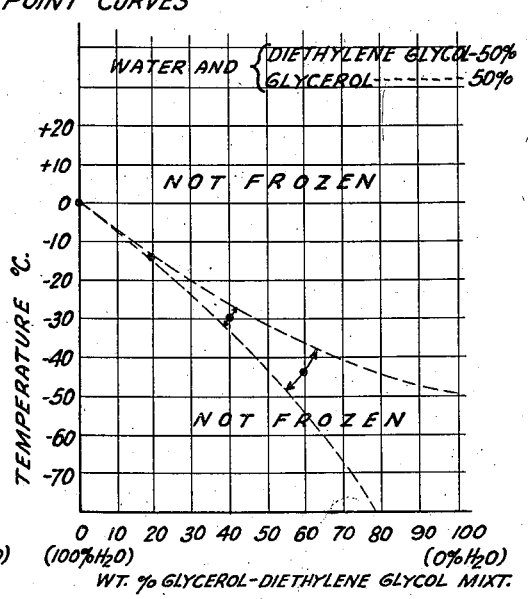

Fig. 3 gives the freezing-point curve for various mixtures of water with a solution comprising equal amounts of ethylene glycol and glycerol, and Fig. 4 gives a curve which attempts to show the effect of low temperatures upon various mixtures of water with a solution comprising equal amounts of diethylene glycol and glycerol.

By way of illustration but not by way of limiting the invention, it may be stated that the several ingredients may be present in the composition forming the softener and contained in the wrapper of the food product of the invention in the following general proportions:

| | Per cent |
|---|---|
| Glycerol | From 10 to 90 |
| Diethylene glycol | From 90 to 10 |

The softener may comprise a mixture of such percentages of glycerol and diethylene glycol as are found to be desirable to effect a satisfactory lowering of the congealing-point and which prevents embrittlation of the pellicle forming the wrapping material. From 5% to 25% of the softener mixture may be dissolved in water or other suitable solvents and incorporated in a pellicle of a non-fibrous hydrophilic colloid material by passing the pellicle through a solution containing the softener during the course of its manufacture, or by spraying the pellicle with the softener, or by other suitable means known to the art.

The article of the invention accordingly comprises the comestible, the pellicle forming the wrapper, and the softener for the wrapper to prevent embrittlation at low temperature.

Pellicles which may be impregnated with the softener and which may be used as the wrappers for food products are any suitable organic film-forming hydrophilic colloids such, for example, as cellulose hydrate, alkali-soluble cellulose ethers, hydrophilic cellulose esters, mixed ester-ethers of cellulose, gelatin, casein, water-swelling resins and the like. The cellulose ethers which may be used to form the pellicle may comprise such ethers of cellulose as the alkyl ethers, the hydroxy-alkyl ethers, the carboxy-alkyl ethers, and the mixed ethers such as alkyl hydroxy-alkyl cellulose ethers, and the cellulose ether xanthates. Cellulose esters which may be used include water-swelling compounds such as low-nitrated cellulose nitrate, low-esterified cellulose acetate, and cellulose formate, as well as mixed cellulose esters. Cellulose hydrate may be regenerated from viscose in the form of a pellicle or obtained from cuprammonium solutions of cellulose, or from solutions of cellulose in inorganic or organic solvents, and the like. Among the water-swelling resins which may be used are the polymers of acrylic acid, such as the substituted esters of acrylic acid, low viscosity urea-formaldehyde resins, and the alkyd resins.

The pellicle may be combined as by coating or impregnating with suitable moistureproof compositions and/or waterproof compositions. A moistureproof coating has the added advantage of retaining the softener within the wrapper of the prepared food product and preventing the pellicle from losing any of the softener by leaching or being dissolved out, as in the cases where the wrapped foodstuff is liable to be exposed to moisture or to water immersion.

Furthermore, a wrapper containing such softener which prevents embrittlement at sub-atmospheric temperatures may be coated on one or both sides with a moistureproofing composition which is also capable in itself of being subjected to very low temperatures without cracking or peeling. An example of such coating is disclosed in the patent application of Ralph T. K. Cornwell and Charles M. Rosser, Serial No. 298,072, under date of October 5, 1939.

It will be noted from the drawing that in every case, with the exception of the water-glycerol-diethylene glycol combination (Fig. 4), a definite freezing-point is attainable for mixtures of water and glycerol, water and diethylene glycol, and water and glycerol-ethylene glycol. On the other hand, the mixture of water-glycerol-diethylene glycol instead of freezing and crystallizing will merely become more viscous as the temperature decreases.

It is the peculiar characteristic of the water-glycerol-diethylene glycol mixture which makes it valuable for use as a plasticizer for preventing embrittlation of a wrapper for a frozen foodstuff, and for such wrapped food products which can be subjected to very low temperatures without damage to the wrapper or the foodstuff.

It has been found that a mixture of glycerol and diethylene glycol has a freezing point which is indeterminate. In the case of a mixture of 50% glycerol with 50% diethylene glycol unsuccessful attempts were made to actually freeze the composition. Apparently the mixture is capable of existing in a metastable condition. The same condition exists and holds true when such mixture is diluted with water. For example, when the softener is made up with equal proportions of glycerol and diethylene glycol and when such softener is mixed with various proportions of water, no visible crystallization occurs, even when the mixtures are lowered to temperatures as low as $-70°$ C. This may readily be seen by referring to Fig. 4 of the drawing. Such mixtures become very heavy and viscous, but do not show any sharp melting points or any determinable freezing points. When cooled to temperatures as low as $-55°$ C. and below the mixture merely becomes thick, and upon agitation with a glass rod or by "seeding" the temperature increases to $-40°$ C. and higher, but no definite crystallization takes place.

The solvent which may be used to dilute the softener of the invention comprises an aqueous or non-aqueous substance which is miscible with the glycerol-diethylene glycol mixture, and which permits impregnation of the pellicle forming the wrapping material. The preferred solvent of the invention is water.

The pellicle forming the wrapper for the food product of the invention may be impregnated with the softener by passing such pellicle through a bath containing from 5% to 25% of the softener in aqueous solution, depending upon the method by which the pellicle has been formed. If the pellicle is to be plasticized during the manufacturing process but before it is dried an aqueous bath containing as low as 5% of the glycerol-diethylene glycol softener may be used. If it is desired to recondition pellicles of non-fibrous hydrophilic colloids after they have been manufactured, it may be necessary to replace the 5% softener solution with a solution containing from 15% to 20% of said softener. The thickness of the sheet or pellicle which is to be used must also be taken into consideration. A thick sheet of regenerated cellulose, for example, will require a higher percentage of softener than a thinner pellicle of the same material.

Wrapping materials formed from pellicles of non-fibrous hydrophilic colloids are especially suitable for use with frozen foodstuffs since they are capable of withstanding the freezing treatments such as the brine freezing process, air blasting methods and other such rigorous treatment to which these foodstuffs are subjected, while at the same time they form an attractive transparent package for display purposes. The wrapping materials may be formed into sheets, tubes or bags, or other suitable containers for frozen foods, or liners for cartons, or the colloid may be extruded in the form of a seamless casing.

By way of illustration but not by way of limiting the invention, the following examples of the composition of the article before moistureproofing are given:

EXAMPLE I

Regenerated cellulose pellicle "A" (weighing 33 grams per square meter):

|  | Percent |
|---|---|
| Cellulose | 83 to 78 |
| Softener (50% diethylene glycol and 50% glycerol) | 12 to 14 |
| Water | 5 to 8 |

EXAMPLE II

Regenerated cellulose pellicle "B" (weighing 60 grams per square meter):

|  | Percent |
|---|---|
| Cellulose | 79 to 70 |
| Softener (50% diethylene glycol and 50% glycerol) | 16 to 20 |
| Water | 5 to 10 |

The foodstuffs which are packaged and wrapped with such suitable wrapping materials as given in the above examples, and which may be preserved by freezing comprise such perishable products as fruits, berries, vegetables, meats, fowls, and fish of all kinds, and other comestibles too numerous to mention. Temperatures at which these food products are preserved and frozen range from 0° C. to as low as −60° C. Authorities claim that the lower the temperature used in freezing such foodstuffs the more perfectly the structure is preserved and the less is the bacterial and chemical decomposition upon thawing. Experimentally, fresh peaches have been preserved by quick-freezing methods at temperatures as low as −73° C. (−100° F.). At this temperature it will be seen that these foodstuffs must be encased in a manner and with such wrapping material as to withstand the severity of the process, and also with such wrapping material which is able to successfully withstand the tremendous internal stresses and strains thereby produced.

One advantage which may be said for a pellicle containing the softener of the invention permits its being used as a wrapper for a frozen foodstuff or other frozen comestible at low temperatures, and at the same time the softener prevents embrittlation and fracturing of the wrapper which might otherwise occur. The transparency of the wrapper is not impaired, because no appreciable crystallization takes place. Furthermore, the softener described will not impair the taste or quality of the food product if by chance a small portion should come into contact with the foodstuff.

Since certain changes may be made in the above product and different embodiments of the invention could be made without departing from the scope thereof, it is intended that all matter contained in the above description shall be interpreted as illustrative and not in a limiting sense.

It is also to be understood that the following claims are intended to cover all the generic and specific features of the invention herein described and all statements of the scope of the invention which, as a matter of language, might be said to fall therebetween.

Having described our invention, what we claim as new and desire to secure by Letters Patent is:

1. In a wrapped frozen food product comprising a mass of frozen food encased in a flexible wrapper which does not adhere to said food and which protects the food from desiccation and freezer burn, a wrapper comprising a non-fibrous hydrophilic organic colloid containing a plasticizer comprising water, glycerol and diethylene glycol, said plasticizer maintaining said wrapper flexible at sub-atmospheric temperatures.

2. In a wrapped frozen food product comprising a mass of frozen food encased in a flexible wrapper which does not adhere to said food and which protects the food from desiccation and freezer burn, a wrapper comprising a non-fibrous hydrophilic colloid containing a softener comprising from 10% to 90% glycerol and from 90% to 10% diethylene glycol, said softener maintaining said wrapper flexible at sub-atmospheric temperatures.

3. In a wrapped frozen food product comprising a mass of frozen food enveloped in a flexible transparent wrapper which does not adhere to said food and which protects the food from desiccation and freezer burn, a wrapper comprising a non-fibrous organic hydrophilic colloid containing a softener comprising a mixture of glycerol and diethylene glycol, the wrapper having a moistureproof coating on at least one surface thereof.

4. In a wrapped frozen marketable package comprising a food product having a flexible wrapper thereon which does not adhere to said food and which protects the food from desiccation and freezer burn, a wrapper comprising a non-fibrous cellulosic material, a plasticizer for said wrapper comprising a mixture of water, glycerol and diethylene glycol, which plasticizer does not impair the quality of the food product and which is present in such proportions as to maintain the wrapper substantially flexible at temperatures below 0° C.

5. In a wrapped preserved food product comprising a mass of perishable frozen food encased in a transparent flexible wrapper which does not adhere to said food and which protects the food from desiccation and freezer burn, a wrapper comprising a pellicle of regenerated cellulose, a softener for said pellicle comprising a mixture of glycerol and diethylene glycol which prevents said wrapper from cracking at sub-atmospheric temperatures.

6. In a wrapped frozen food product comprising a mass of frozen food encased in a flexible tubular casing which does not adhere to said food and which protects the food from desiccation and freezer burn, a casing comprising a non-fibrous hydrophilic organic colloid containing a plasticizer comprising water, glycerol and diethylene glycol, said plasticizer maintaining said casing flexible at sub-atmospheric temperatures.

7. In a wrapped frozen food product comprising a mass of food contained in a carton having a flexible liner which does not adhere to said food and which protects the food from desiccation and freezer burn, a liner comprising a non-fibrous hydrophilic colloid containing a plasticizer comprising water, glycerol and diethylene glycol, said plasticizer maintaining said liner flexible at temperatures below 0° C.

8. In a wrapped food product comprising a mass of frozen food encased in a transparent flexible wrapper which does not adhere to said food and which protects the food from desiccation and freezer burn, a wrapper comprising a non-fibrous cellulosic material and a softener for said material comprising a mixture of glycerol and diethylene glycol, said wrapper being combined with a waterproofing composition.

9. In a wrapped package of perishable food comprising a mass of frozen food encased in a flexible wrapper which does not adhere to said food and which protects the food from desiccation and freezer burn, a wrapper comprising a non-fibrous hydrophilic colloid plasticized with a mixture comprising water, glycerol and diethylene glycol which maintains said wrapper flexible under conditions of freezing and cold storage, said glycerol and diethylene glycol being present in the wrapper approximately in equal proportions by weight.

FRANK H. REICHEL.
RALPH T. K. CORNWELL.